United States Patent [19]

Malone

[11] 4,054,548
[45] Oct. 18, 1977

[54] POTTERY-LIKE MENDING COMPOSITION

[76] Inventor: Laurence A. Malone, 2111 Jefferson Davis Highway, Arlington, Va. 22202

[21] Appl. No.: 775,525

[22] Filed: Mar. 8, 1977

Related U.S. Application Data

[63] Continuation-in-part of Ser. No. 672,069, March 30, 1976, abandoned.

[51] Int. Cl.$^2$ .............................................. C08L 63/02
[52] U.S. Cl. ................................................ 260/37 EP
[58] Field of Search ................................... 260/37 EP

[56] References Cited

U.S. PATENT DOCUMENTS

| | | | |
|---|---|---|---|
| 3,025,263 | 3/1962 | Lee | 260/37 EP |
| 3,468,824 | 9/1969 | Williams | 260/37 EP |
| 3,554,968 | 1/1971 | Hebermeir et al. | 260/37 EP |

*Primary Examiner*—Lewis T. Jacobs

*Attorney, Agent, or Firm*—Larson, Taylor and Hinds

[57] ABSTRACT

Disclosed herein is a composition comprising a first component and from 40 to 60 percent by volume of a second component, which hardens into a pottery-like substance when the two components are mixed together. No firing is required and the composition has suitable pot life to permit sculpturing or modeling application by hand. Further, the composition may be tinted with acrylic base colors, and applied as textured structural cement or mortar to stone, pottery, and other like ceramics. This composition may be used for modeling, sculpturing restoration of missing parts of stone or ceramic objects, especially in the field of art. The composition and each component are water soluble. The composition is adhesive, air-drying and self curing. The first component includes EPON 828 resin as well as bisphenol-A, epichlorohydrin, calcium carbonate, and sodium sulphate. The second component includes calcium carbonate, methylacetanilide, and talc.

3 Claims, No Drawings

POTTERY-LIKE MENDING COMPOSITION

This is a continuation-in-part of application Ser. No. 672,069, filed Mar. 30, 1976, and now abandoned.

Field of the Invention

The invention relates to a pottery-like clay composition comprising a unique combination of epoxy-resins, curing agents, and other chemicals resulting in an adhesive clay material useful in restoring art objects. In particular, it relates to a composition which is curable at room temperature and is effective in sculpturing, remodeling, mending and restoring stoneware and pottery-like ceramics, as it provides a structural textured cement for an extended period of time. Animal figures or any ceramic object may be simulated out of this resinous clay.

BACKGROUND OF THE INVENTION

Pottery is made of clay without kaolin. Kaolin is essential to making porcelain (china), but is not essential nor is it used in making pottery. Pottery is an earthenware and very different in structure from porcelain. Pottery is hardened by heat and is made of a mixture of coarse clay, which produces the rough texture from which it gets its common name. Basically, pottery is a pliable earthen clay, not containing kaolin, and is therefore easily molded, shaped, fired, and hardened for commercial use. The epoxy-resinous composition invented herein look like and hardens to the rough consistency of pottery and may be used for filling and mending missing pieces as well as for producing a bisque finish on such porcelain as Sevres, Wedgewood and the like, or a structural arm, leg, hand or an entire figure. The composition invented herein is excellent for restoring and finishing soft paste pottery referred to as faience or majolica.

A great need exists for a mendingand restoring material externally identical or interchangeable with pottery and similar ceramics such as faience, majolica or stoneware, which requires no kiln or firing and which is adhesive, hardenable thermogenetically, air drying, self-curing, and which may be molded and applied by hand. Such a material would be essentially useful for pottery repair and structural or molded finishes stone-like in nature, and as a clay-like material which to fashion animals, hands, feet, figures or identical finishes over broken areas of an existing pottery or ceramic article. This adhesive, clay-like material should harden without being subjected to high temperatures and could be used with considerably convenience and efficiency to repair or modify ceramics and pottery decorated by paint and other materials which would normally be destroyed by subjection to high temperatures or re-firing. The material would desirably exhibit a small coefficient of expansion, matching that of pottery. The material composition desirably could withstand high temperatures to which a china-like object may be subjected in use, such as when being cleaned in a dishwasher. Once cured, the material would be impervious to hot or cold water, acids, stains, saline solutions, and the like.

It is an object of the present invention to provide a material which is capable, without firing, of hardening into a hard and stone-like substance.

It is similarly an object of this invention to provide a composition which sets to a structurally hard mortar-like consistency and adhesiveness and which may be substantially externally indistinguishable from the ceramic to which it is applied.

It is another object of this invention to provide a ceramic compound or mortar which is thermogenetic, and which hardens without heating or baking, fairly rapidly and is impervious to water and changes of temperature.

It is similarly an object of this invention to provide a composition which can be mixed with acrylic base paints to enable a ceramist or china-maker to simulate and restore the ceramic article he is mending, in such a manner that the bisque or stoneware surface of the article is restored to perfection and the damage is invisibilized.

It is another object of this invention to provide a composition having a low coefficient of expansion similar to that of pottery or stoneware.

It is another object of this invention to provide materials for the repair, modification and resurfacing of ceramics, stoneware and the like, without heating of any kind and without high temperature treatment.

SUMMARY OF THE INVENTION

The foregoing and other objects which will be apparent to those having ordinary skill in the art, are achieved according to the invention by providing a composition comprising EPON 828, an epoxy resin, epichlorohydrin, bisphenol-A, calcium carbonate, methylacetanilide, and talc. This composition comprises a first component in admixture with 40 to 60 percent by volume, or 44 to 56 percent by weight, of a second component.

The first component includes about 12.5 percent to 18.3 percent by weight EPON 828; from 1.1 percent to 3.0 percent by weight bisphenol-A; 52.5 percent to 76.5 percent by weight of calcium carbonate; from 2.0 percent to 2.8 percent by weight of sodium sulphate; from 2.0 percent to 2.9 percent by weight of epichlorohydrin the percentages by weight being based on the total amount of said first component used in the experiment, which was 8 ounces; and the second component includes from 9.6 percent to 15.3 percent by weight of methylacetanilide; from 57.0 percent to 80.5 percent by weight calcium carbonate; and from 1.7 percent to 4.2 percent by weight talc, which was also equated to the total amount of said second component, 8 ounces.

EPON 828 is a trademark of Shell Chemical Company. It represents an epoxy resin generally formed from the condensation of bisphenol-A with epichlorohydrin. It is a liquid at room temperature, having a Gardner-Holt viscosity of 100–160 poise at 20° C and an epoxide equivalent of 185–192 grams of resin containing one gram-equivalent of epoxide. This resin is more fully described in Shell Chemical Company Technical Publication SC:71-17, entitled "EPON Resin Esters for Surface Coatings", dated August, 1971.

DETAILED DESCRIPTION OF THE INVENTION

The useful concentration ranges of the disclosed compounds in the composition described herein are illustrated in the following Table I.

TABLE I

| First Component | % by weight of first component |
|---|---|
| EPON 828 | 12.5–18.3 |
| bisphenol-A | 1.1–3.0 |
| epichlorohydrin | 2.0–2.9 |
| calcium carbonate | 52.5–76.5 |

TABLE I-continued

| sodium sulphate | 2.0–2.9 |
|---|---|
| Second Component | % by weight of second component |
| methylacetanilide | 9.6–15.3 |
| calcium carbonate | 57.0–80.5 |
| talc | 1.7–4.2 |

The following example illustrates a preferred embodiment of the present invention. A mending composition having the ingredients described in Table II was prepared by blending the particulate ingredients in a suitable container.

TABLE II

| First Component | Amount (g) | % by weight |
|---|---|---|
| EPON 828 | 41.5 | 17.6 |
| bisphenol-A | 6.8 | 2.9 |
| epichlorohydrin | 6.7 | 2.9 |
| calcium carbonate | 173.5 | 73.9 |
| sodium sulphate | 6.4 | 2.7 |
| Second Component | Amount (g) | % by weight |
| methylacetanilide | 16.4 | 15.3 |
| calcium carbonate | 81.5 | 75.8 |
| talc | 9.5 | 8.9 |

The first component is prepared by blending the particulate ingredients in any suitable container. Simple hand stirring was employed in this example. The epoxy is conveniently in liquid soluble form, and there is normally sufficient liquids to meet the requirements of blending. This is true of the second component as well.

Prior to use, a portion of the second component was blended with an equal volumetric portion of the first component and mixed in any convenient manner, in this case by hand mixing.

The material was clay-like in composition and changed to a semi-solid stone-like composition in a fairly short time, 20 to 35 minutes, longer setting time resulting when more water is present. Free water rapidly disappeared and the mixture began to set up hard in about 45 minutes. The product set up, without firing, to a bisque-like finish. The hardened material was as hard and as strong as stone and was impervious to water and resistant to elevated temperatures, boiling and the like, and to changes in temperature and is eminently suitable for simulating, repairing, modification, restoration and mending of ceramic and pottery-like objects.

The following are illustrative instructions for repairing, resurfacing, modifying and restoring damages common to stoneware, ceramics, pottery and china; glaze damage to the edge of a stoneware saucer or plate or similar article, lost or missing surface chips, broken out edge chips, and flake chips. The damages discussed are by no means the only kinds of damage that can be repaired, but the discussions are indicative of basic teachings.

Glaze Damage and Chips Replaced:

1. Place a small amount of the composition of Example I in a suitable container.
2. Add tint or shade of pigment or acrylic base paint to match background of the ceramic to be mended.
3. Smooth the clay composition into the areas where it is needed. It can be handled to fill cracks, nicks and molded to restore small broken out areas. It is especially serviceable for covering over large areas that need repair. If the surface flake damage has bitten down slightly into the china surface below, prepare the clay using your fingers to press it in evenly.
4. Permit the material to get semi-hard, which it will do in about 20 minutes.
5. Dampen fingers in water before material has set and smooth away excess, which reduces need for sanding and eliminates the scratching of surrounding areas of glaze.
6. Permit the material to harden. Finish will be bisque. This material will adapt itself to acrylic paints for decorating (china painting). A final gloss may be added with one of the commercial spray glaze types.

Edge Chip Damage:

Edge chip damage is a damage that occurs when one or two pieces in the shape of a "V" or wedge are broken out of the side or lip edge of an article and a backup support of masking tape is required to hold the composition in place.

1. Apply the tape to the underside of the article to be repaired, carefully supporting the underside of the open "V" area. Reinforce with a commercial adhesive putty such as Mortite or Plasticine to hold tape firm, because it may sag when the filler or composition is laid on it. Clean the area with lacquer thinner, containing methylate. Air dry.
2. Prepare a mix of the composition and make a fairly firm modeling clay of it by using equal parts by volume.
3. Lay in the clay by hand.
4. Dampen fingers in methylate or water and smooth away excess after 20 minutes or so, as the material will then be semi-hard.
5. If the damage area is deep, apply two or three thick layers, one layer at a time.
6. Balance the article in a sand box, if necessary, and allow to dry between applications. The final application should be smoothed and the excess smoothed away by dampening the fingers in water or methylate.
7. Match and mix the final shade of paint color with the composition to match the article being mended. When dry, glaze the item, unless a bisque finish is desired. When dry, the article will be ready for final decoration if it is a pattern piece.

Surface Restoration:

Where the surface of an article of stoneware or pottery has eroded or become badly stained by calcareous material, this composition is especially useful in restoration of the surface.

1. Make a very firm paste mix by using methylate lacquer thinner or plain water, allowing the initial mix to stand a few minutes.
2. Assuming the full surface has been cleaned insofar as possible, and is prepared to receive the paste, apply the composition-paste in a thick layer all over the damaged surface by hand. Use water or methylate to smooth as you go, until you have exactly the smoothness needed to blend in with the unrestored surfaces of the article.
3. The paste may be combined with any acrylic base paint to obtain the tint desired. Mix well with a spatula in a circular motion. The resulting compound will have adhesiveness sufficient for it to hold to the surface to which applied. It will not run or drip. It will also cover all erosion and stains, surface flaking and the like. When the compound has hardened, decorate and glaze.

Conventional pigments, texturizing agents and the like, may also be added to either or both components in amounts needed for a desired pigmentation of texture effect, but will generally be used in an amount of not more than 3 percent by weight of the composition. It will be clear to those having ordinary skill in the art that other materials such as pigmens, filler, and the like can be incorporated into the composition to impart color, texture and strength. The first component should also first be tinted to match the surface of the porcelain article to which the admixture (compound) is going to be applied. The strengthened composition can be used to provide or simulate, structured or sculptured objects as well as bond two pieces of material together.

I claim:

1. A mending composition capable of hardening into a hard, clay-like material and comprisng a mixture of a first component which comprises:
   12.5–18.3% by weight of an epoxy resin having a viscosity of 100–160 poise and an epoxide equivalent of 185–192;
   1.1–3.0% by weight of bisphenol-A;
   2.0–2.9% by weight of epichlorohydrin;
   52.5–76.5% by weight of calcium carbonate; and
   2.0–2.9% by weight of sodium sulphate; and a second component which comprises:
   9.6–15.3% by weight of methylacetanilide;
   57.0–80.5% by weight of calcium carbonate; and
   1.7–4.2% by weight of talc.

2. The composition of claim 1 wherein the second component is present in an amount of from 40 to 60 percent by volume.

3. The composition of claim 1 wherein the first component comprises:
   18.3% by weight of an epoxy resin having a viscosity of 100–160 and an epoxide equivalent of 185–192;
   3.0% by weight of bisphenol-A;
   2.9% by weight of epichlorohydrin;
   76.5% by weight of calcium carbonate; and
   2.9% by weight of sodium sulphate; and the second component comprises:
   15.3% by weight of methylacetanilide;
   80.5% by weight of calcium carbonate; and
   4.2% by weight of talc.

* * * * *